(12) United States Patent
Kim (10) Patent No.: US 9,639,136 B2
(45) Date of Patent: May 2, 2017

(54) APPARATUS AND METHOD FOR SCALABLE MONITORING OF RACE DETECTION IN PARALLEL PROGRAMS BASED ON MULTI-CORES

(71) Applicant: Electronics and Telecommunications Research Institute, Daejeeon (KR)

(72) Inventor: Young Joo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 273 days.

(21) Appl. No.: 14/466,396

(22) Filed: Aug. 22, 2014

(65) Prior Publication Data

US 2015/0198993 A1    Jul. 16, 2015

(30) Foreign Application Priority Data

Jan. 16, 2014    (KR) .......................... 10-2014-0005482

(51) Int. Cl.
*G06F 1/26* (2006.01)
*G06F 1/32* (2006.01)
(Continued)

(52) U.S. Cl.
CPC ............ *G06F 1/3206* (2013.01); *G06F 1/329* (2013.01); *G06F 9/52* (2013.01); *G06F 11/0721* (2013.01);
(Continued)

(58) Field of Classification Search
CPC . H04L 43/00; H04L 43/04; G06F 9/52; G06F 11/14; G06F 11/2242; G06F 17/608
(Continued)

(56) References Cited

U.S. PATENT DOCUMENTS 7,076,776 B2    7/2006    Kim et al.
2007/0198864 A1*    8/2007    Takase ................ G06F 1/26
                                                                713/300
(Continued)

FOREIGN PATENT DOCUMENTS

JP    2010250858 A    11/2010
KR    1020110042404 A    4/2011

OTHER PUBLICATIONS

Young-Joo Kim, A Preprocessor for Detecting Potential Races in Shared Memory Parallel Programs with Internal Nondeterminism, pp. 1-10.

*Primary Examiner* — Michael J Brown
(74) *Attorney, Agent, or Firm* — William Park & Associates Ltd.

(57) ABSTRACT

Provided are a scalable monitoring apparatus and method for detecting a race when a multicore-based parallel program is executed. The scalable monitoring apparatus for race detection of a multicore-based parallel program includes a monitoring code inserting unit configured to add a scalable monitoring code to a source parallel program to generate a transformed source parallel program, a thread monitoring unit configured to generate a data structure of a thread generated according to execution of the transformed source parallel program, an access event selecting unit configured to inspect a race likelihood according to execution of the transformed source parallel program to select an access event, an access event storage unit configured to store the access event in a shared data structure, a power measuring unit configured to measure and store power data according to execution of the source parallel program, and a power analyzing unit configured to analyze the power data to determine whether an energy bug has been generated.

18 Claims, 11 Drawing Sheets

(51) Int. Cl.
   *G06F 9/52*    (2006.01)
   *G06F 11/30*   (2006.01)
   *H04L 12/26*   (2006.01)
   *G06F 17/00*   (2006.01)
   *G06F 11/07*   (2006.01)

(52) U.S. Cl.
   CPC ........ *G06F 11/3089* (2013.01); *G06F 17/608* (2013.01); *H04L 43/04* (2013.01); *H04L 43/10* (2013.01); *Y02B 60/144* (2013.01)

(58) Field of Classification Search
   USPC ................................ 713/300, 320, 330, 340
   See application file for complete search history.

(56) References Cited

U.S. PATENT DOCUMENTS

| | | |
|---|---|---|
| 2009/0313490 A1 | 12/2009 | Tani |
| 2012/0166824 A1 | 6/2012 | Tani |
| 2014/0281727 A1* | 9/2014 | Venkataraman .... G06F 11/3604 714/37 |

\* cited by examiner

APPARATUS AND METHOD FOR SCALABLE MONITORING OF RACE DETECTION IN PARALLEL PROGRAMS BASED ON MULTI-CORES

CROSS-REFERENCE TO RELATED APPLICATIONS

This application claims priority under 35 U.S.C. §119 to Korean Patent Application No. 10-2014-0005482, filed on Jan. 16, 2014, the disclosure of which is incorporated herein by reference in its entirety.

TECHNICAL FIELD

The present invention relates to a scalable monitoring apparatus and method for detecting a race when a multicore-based parallel program is executed.

BACKGROUND

A multi-core CPU, in which two or more independent cores are incorporated into a single package including a single integrated circuit, is also known as a chip-level multiprocessor (CMP). Such a multicore CPU may reduce a power request and an ineffective increase in hardware and decrease maintenance cost.

Parallel computing is a method of computing a large amount of calculations simultaneously. Through this method, a large and complicated problem is divided into small parts so as to be calculated in parallel simultaneously.

In a parallel computing environment, a single task is dividedly performed by multiple CPUs, thus enhancing utilization of CPUs and task efficiency, increasing a processing speed, and reducing power consumption.

The parallel computing environment may be applied to fields of sensor network-based monitoring and reconnoitering, the fields of application programs of smart devices, and the fields of service application based on clouding computing.

In order to provide high performance services to users or address problems within a short time using the parallel computing environment, sequential codes are converted into parallel codes or systems are initially constructed with parallel codes according to recent technologies.

However, parallel programs, such as Open Multi-Processing (OpenMP, a shared memory multiprocessing programming API supporting the C language, C++ language, Fortran language, UNIX and Microsoft Windows platform, etc.), Open Computing Language (OpenCL, open general-purpose parallel computing framework), Pthread, and C++0x, executed in a parallel computing environment may be performed in unintended order due to physical or logical concurrency, causing errors not intended by programmers.

These problems may generate unintended energy bugs in programs, and thus, a technique of effectively detecting errors generated in programs is required to be developed.

A race is one of main causes or errors that occur in a parallel computing environment.

A race condition takes place in shared variables including at least one write event without appropriate synchronization of parallel threads in a multi-programming system or multi-processor system. This may produce a result unintended by a user.

An error in a race is difficult to predict. Namely, a race may not occur with programs that are executed thousands of times or tens of thousands of times, but may occur at a very important point to cause an execution aspect that does not correspond to a user intention.

A typical execution aspect that does not correspond to a user intention is an infinite loop in a program which loops endlessly or an unintended routine that is performed. When an unexpected resultant value is obtained or severe due to a race, an overall system may be unresponsive. For example, there has been reported a case of United States Ship (USS) which was stopped running for a few hours in the heart of the Pacific Ocean due to an overflow inadvertently occurring in a program. Also, a particular application may loop endlessly due to malfunction of a smart device to cause a huge amount of power consumption. Races cause these phenomena, which, thus, need to be detected in any events. Among races, a race which occurs first in temporal order or logical order and not affected by other races is known as an initial race.

Figure 1:
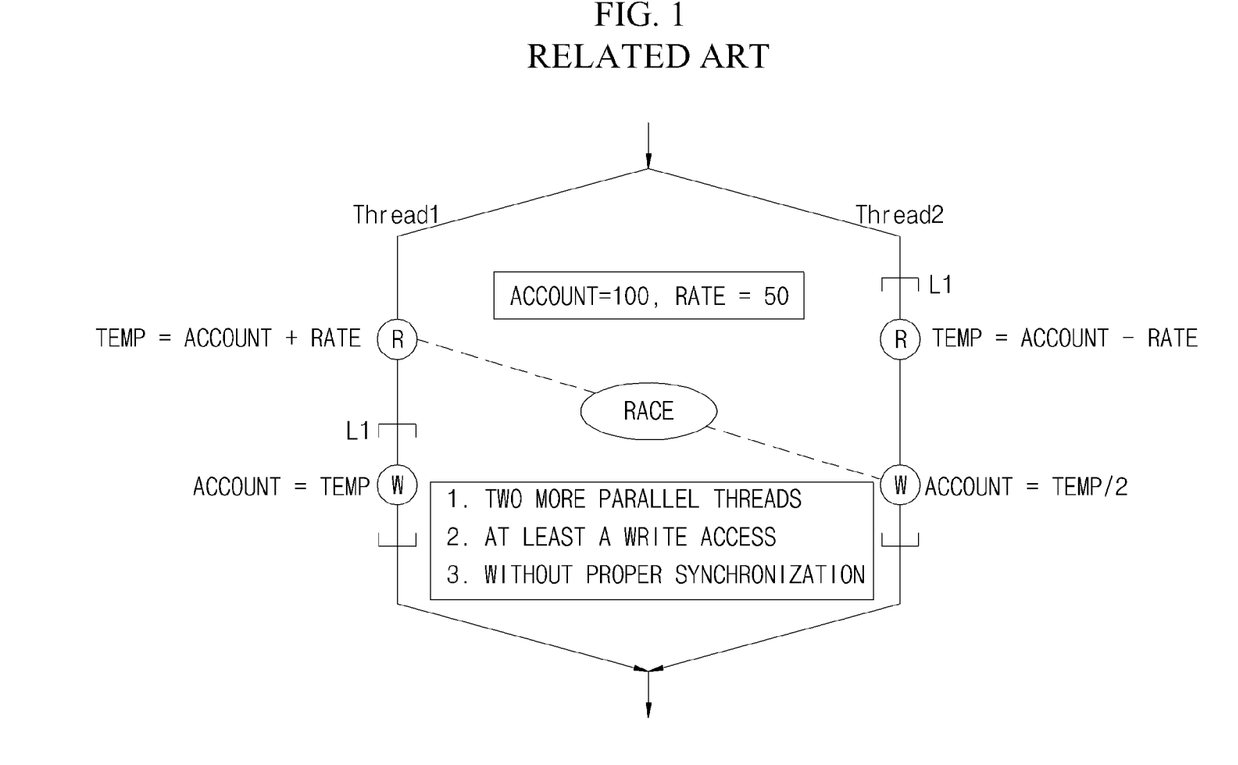
FIG. 1 is a conceptual view illustrating an example of a race that occurs in performing a parallel program.

FIG. 1 is a view illustrating an example of a general race. Referring to FIG. 1, two threads are performed in parallel and account values may be 50 or 75 according to a program execution aspect.

However, due to occurrence of a race between R (read access event) of a thread 1 (Thread1) and W (write access event) of a thread 2 (Thread2), a value 150 unintended by a programmer may be produced, and thus, a program may be abnormally operated.

Typical race detection techniques include static analysis, post-mortem detection, and on-the-fly detection.

The static analysis is a technique of analyzing a source code of a program and detecting every latent race that may occur. The post-mortem detection is a technique of performing and analyzing a trace file generated as a particular program is executed. The on-the-fly detection is a technique of simultaneously executing and analyzing a program to detect a race.

According to the on-the-fly detection, each access event with respect to a particular shared variable is basically inspected and compared with previous access events retained in access history.

However, in the case of the on-the-fly detection, access to the access history, a shared data structure, causes a severe bottleneck phenomenon, degrading performance. Thus, in the related art access event selection techniques, in order to reduce the bottleneck phenomenon, only access events that are likely to race are allowed to access the access history. In order to supplement the problem of the on-the-fly detection, a scalable monitoring technique for race detection has been proposed.

Figure 2:
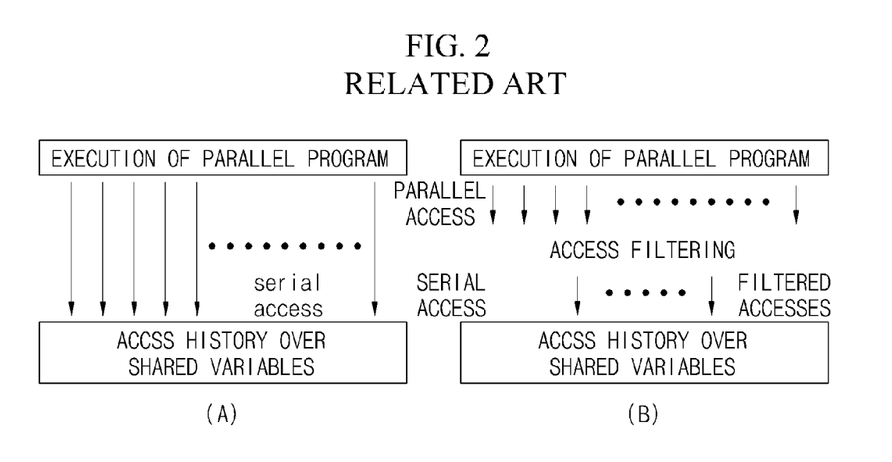
FIGS. 2 and 3 are conceptual views illustrating scalable monitoring according to the related art.

FIG. 2 is a conceptual view illustrating a scalable monitoring technique for race detection. Referring to FIG. 2, all the access events that occur in program (A) of FIG. 2 sequentially access history, causing a bottleneck phenomenon to degrade race detection performance.

In contrast, access events that are likely to race, among access events occurring in a program (B) of FIG. 2, selectively access the access history through an access filtering process of an access filter, increasing performance of race detection.

Figure 3:
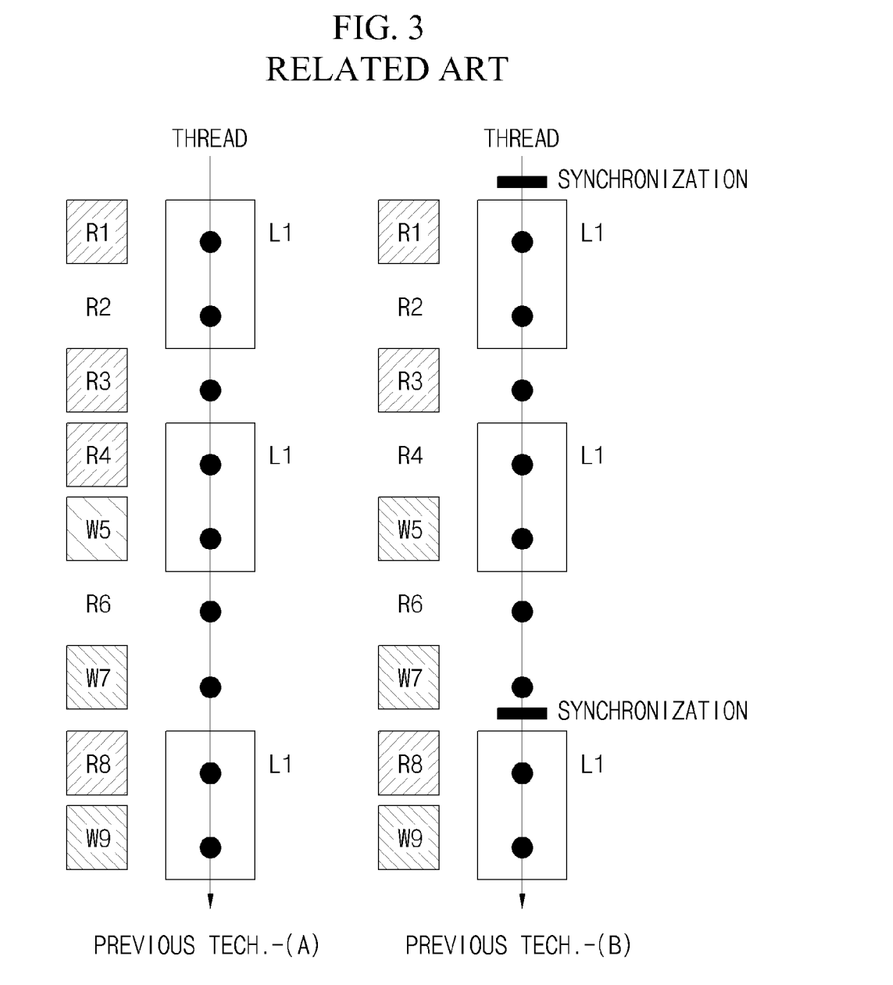

FIG. 3 is a view illustrating an example of an up-to-date scalable monitoring scheme technique in the scalable monitoring technology of FIG. 2, in which L1 is a lock variable, R and W are read and write access events with respect to shared variables, respectively, and numbers following the access events are random occurrence order, respectively.

Referring to (A) of FIG. 3, in order to detect a race in a program model with locks, only seven access events, among a total of nine access events, are monitored and allowed to access the access history, a shared data structure, for race detection, whereby a bottleneck phenomenon that occurs in the shared data structure may be reduced and power consumed to detect a race may also be reduced.

A key principle of this technique is selecting at least a pair of read/write access events each time a lock occurs, and in this case, the number of access events monitored in each thread is 2(U+1) where U is the number of unlocks which has occurred in each thread.

Referring to (B) of FIG. 3, only six access events, among a total of nine access points, are monitored for race detection in the program model including locks and synchronization commands (post/wait).

This is similar to the technique illustrated in (A) of FIG. 3, but advantageous in that the number of selected access events is smaller.

However, in the technique of (B) of FIG. 3, since after nine access events access the shared data structure, unnecessary access events are deleted, so resolution performance of a bottleneck phenomenon that occurs in the shared data structure is lessened compared to the technique illustrated in (A) of FIG. 3.

A key principle of the technique of (B) of FIG. 3 is not repeatedly monitoring access events in a lock region having the same lock variable within post/wait, the synchronization commands, and in this case, a region between post( ) and wait( ) of a certain thread is defined as a block.

Thus, the number of access events monitored in each thread is $$\sum_{i=1}^{eBlock} B_i,$$

where B is 2($L_i$+1) and $L_i$ is a lock variable of i block.

Importance of the foregoing related art scalable monitoring technique lies in that, in case of race detection of a parallel program, a race that occurs in a program is detected by minimizing the number of access events, a main cause of a degradation of race detection performance, as small as possible.

According to the examples of (A) and (B) of FIG. 3, only two or three access events R2 and R6, or R2, R4, and R6 are excluded from monitoring targets, but this is merely part of the parallel program, and in actuality, numerous threads and access events may occur during execution of a program, and thus, a considerable number of access events are anticipated not to be monitored in case of race detection.

However, the foregoing related art scalable monitoring technique fails to resolve a bottleneck phenomenon that occurs during race detection.

SUMMARY

Accordingly, the present invention provides a scalable monitoring apparatus for scalably monitoring access events that occur in performing a parallel program to reduce a bottleneck phenomenon that occurs in access history, effectively detect a race, and reduce computing power consumed for debugging.

The present invention also provides a scalable monitoring apparatus and method for race detection in multicore-based parallel program capable of avoiding energy bugs.

In one general aspect, a scalable monitoring apparatus for race detection of a multicore-based parallel program may include: a monitoring code inserting unit configured to add a scalable monitoring code to a source parallel program to generate a transformed source parallel program; a thread monitoring unit configured to generate a data structure of a thread generated according to execution of the transformed source parallel program; an access event selecting unit configured to inspect a race likelihood according to execution of the transformed source parallel program to select an access event; an access event storage unit configured to store the access event selected by the access event selecting unit in a shared data structure; a power measuring unit configured to measure power data according to execution of the source parallel program and store the measured power data; and a power analyzing unit configured to analyze the power data stored by the power measuring unit to determine whether an energy bug has been generated.

In another general aspect, a scalable monitoring method for race detection of a multicore-based parallel program may include: adding a scalable monitoring code to a source parallel program to generate a transformed source parallel program; generating a data structure of each thread generated according to execution of the transformed source parallel program; inspecting a likelihood of a race according to execution of the transformed source parallel program using the data structure generated for each thread, to select an access event; storing the selected access event in a shared data structure; measuring and storing power data according to execution of the source parallel program; and analyzing the power data to detect whether an energy bug has been generated.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

Figure 4:
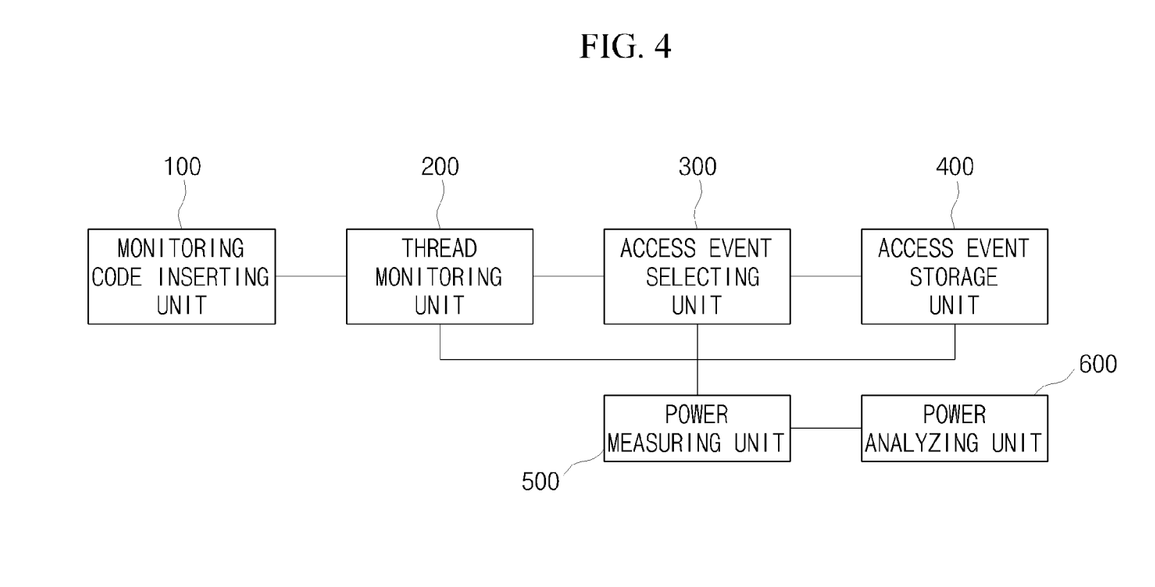
FIG. 4 is a block diagram illustrating a scalable monitoring apparatus for race detection of a multicore-based parallel program according to an embodiment of the present invention.

FIG. 4 is a block diagram illustrating a scalable monitoring apparatus for race detection of a multicore-based parallel program according to an embodiment of the present invention.

As illustrated in FIG. 4, the scalable monitoring apparatus for race detection of a multicore-based parallel program includes a monitoring code inserting unit 100 that adds a scalable monitoring code to a source parallel program to generate a transformed source parallel program, a thread monitoring unit 200 that generates a data structure of a thread generated according to execution of the transformed source parallel program, an access event selecting unit 300 that inspects a race likelihood according to execution of the transformed source parallel program to select an access event, an access event storage unit 400 that stores the access event in a shared data structure, a power measuring unit 500 that measures and stores power data according to execution of the source parallel program, and a power analyzing unit 600 that analyzes the power data to determine whether an energy bug has been generated.

The monitoring code inserting unit 100 adds a code for scalable monitoring to at least one of positions of a position that generates parallelism, a position in which a shared variable is used, and position of a synchronization command to generate a transformed source parallel program.

The monitoring code inserting unit 100 adds at least one of a thread generation code, a thread extinction code, a code for monitoring a read access event of a shared variable, a code for monitoring a write access event of a shared variable, and a synchronization monitoring code to the source parallel program, as codes for scalable monitoring. The scalable monitoring codes may be operated during execution of a program and a thread, an access event, synchronization, and the like, are monitored by each code.

The thread monitoring unit 200 generates data structures of each of a plurality of threads generated according to execution of the transformed source parallel program, which has been transformed by a code added to a parallelism generation position by the monitoring code inserting unit 100 upon scanning the source parallel program.

The plurality of threads generated according to execution of the transformed source parallel program may be assumed as being logical or physical threads. The number of physical threads allocated by a system may vary whenever a program is executed. However, in case of logical threads dependent upon a program, the number of logical threads allocated by a system is fixed unless the contents of a program is changed, and thus, the number of logical threads is equal to or greater than that of physical threads. Thus, in order to enhance reliability of race detection, preferably, a data structure of each of logical threads is generated.

The access event selecting unit 300 inspects a likelihood that an access event will participate in a race according to a program executed by a code added to a position in which a shared variable is used, among scalable monitoring codes added to the source parallel program by the monitoring code inserting unit 100. Through the inspection of the likelihood of participating in a race, an access event that is likely to participate in a race among a plurality of access events with respect to shared variables is selected.

The access event selecting unit 300 selects an access event using individual data structures of the threads or selects an access event using individual data structures of the threads or parallelism between threads. The former selecting method will be referred to as a simple mode monitoring technique and the latter selecting method will be referred to as a detail mode monitoring technique.

The simple mode monitoring is a technique of selecting an access event for each thread independently, and the detail mode monitoring is a technique of selecting an access event using information about parallelism between threads and information of each thread. The detail mode monitoring may be more appropriate than the simple mode monitoring when explicit synchronization is present in a program.

The power measuring unit 500 measures power of a CPU and a process in real time with respect to the source parallel program, and measures power data in synchronization with a point in time at which the access event selecting unit 300 selects an access event. Thus, preferably, power is measured based on integrated software.

The power analyzing unit 600 determines whether an energy bug has been generated by analyzing power data while maintaining synchronization between measured and stored power data and scalable monitoring for race detection.

Figure 5:
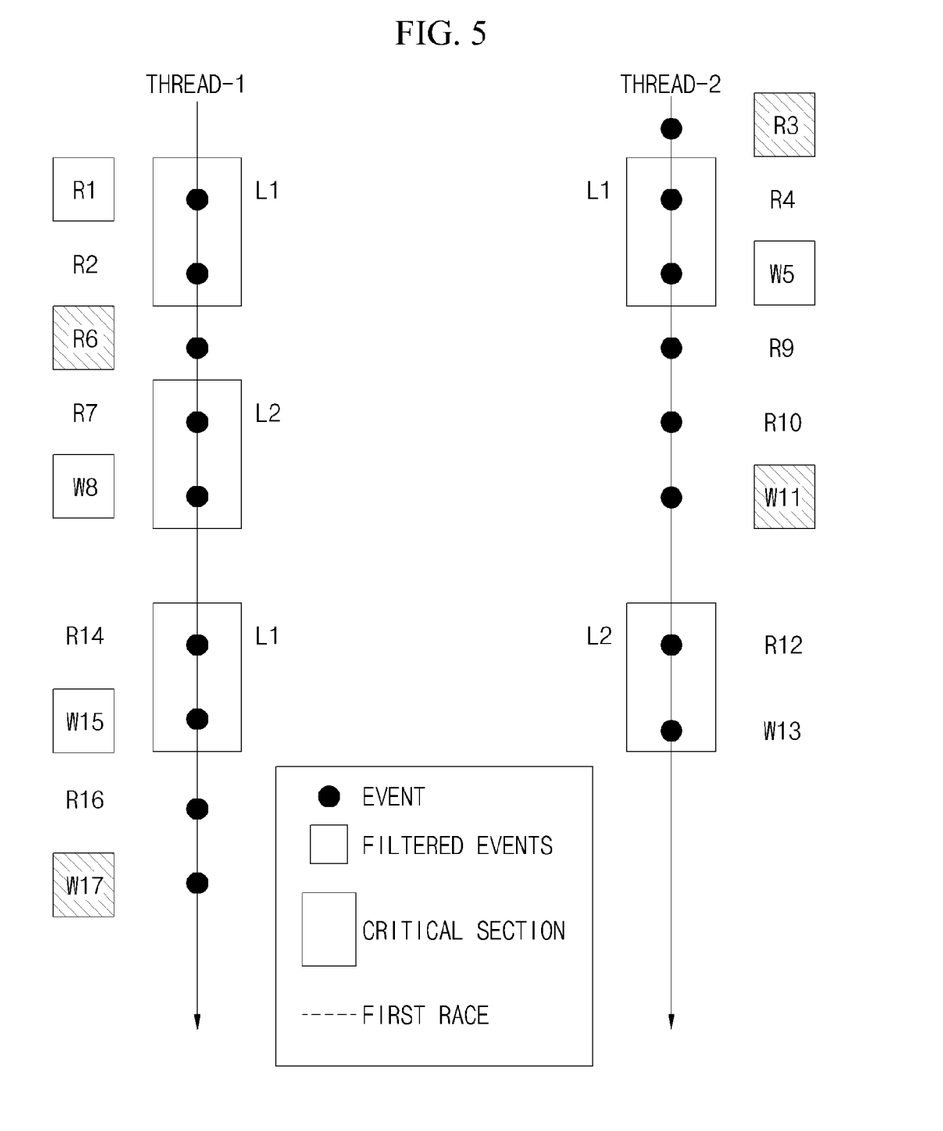
FIGS. 5 and 6 are views illustrating selecting of an access event with respect to a shared variable generated in a parallel program according to an embodiment of the present invention.

FIG. 5 is a view illustrating selecting of an access event with respect to a shared variable generated in a parallel program according to an embodiment of the present invention, in which an access event is selected according to the simple mode monitoring as mentioned above.

Referring to FIG. 5, simple mode monitoring of the access event selecting unit 300 based on lock variables is superior in terms of scalable monitoring to the related art, in that the number of selected access events is smaller.

In FIG. 5, R is a read access event, W is a write access event, Lx is a lock variable, R1, W5, W8, W15 are selected access events, R3 and R6 are partial selection suspended cases, and W11 and W17 are entire selection suspended cases.

In FIG. 5, in L1 lock of THREAD-1, R1 and R2 are in an ordered relationship. Namely, when R1 is related to THREAD-2, R2 is necessarily related to THREAD-2, and thus, R1 is a selected access event and R2 is not selected. Also, since R1 has been already selected in L1 lock, R14 is not selected.

However, the simple mode monitoring illustrated in FIG. 5 has a problem in that an optimal access event may not be selected when explicit synchronization exists in a program.

Figure 6:
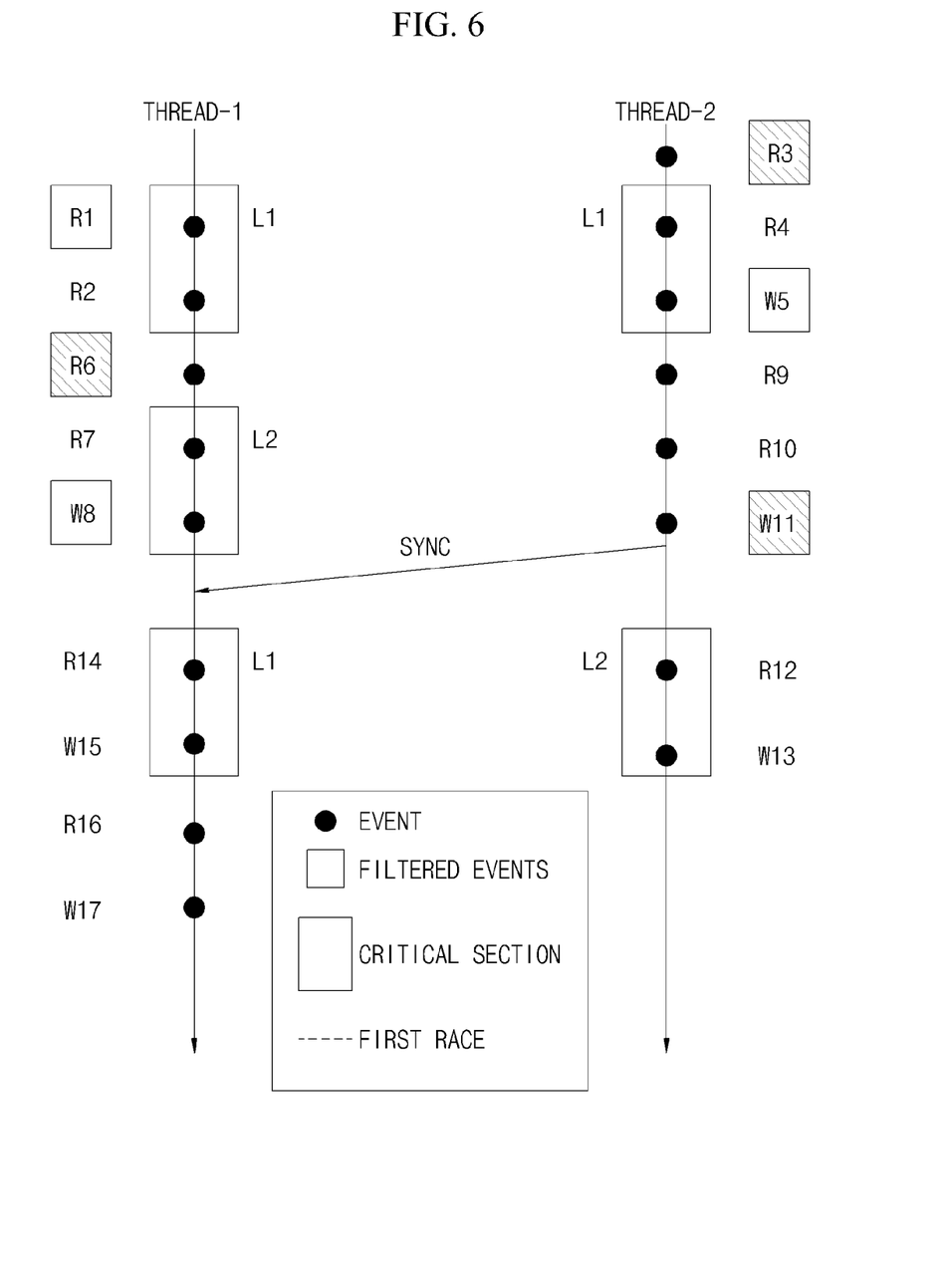

FIG. 6 is a view illustrating selecting of an access event with respect to a shared variable generated in a parallel program according to an embodiment of the present invention, in which an access event is selected according to the detail mode monitoring as mentioned above.

The use of the detail mode monitoring allows for optimally selecting an access event using information of parallelism between threads and information of each thread even when explicit synchronization exists in a program. The number of access events selected by the access event selecting unit 300 is expressed as Equation (1) below.

$$\Sigma_{i-1}^{N} \Sigma_{j-1}^{T} 2(L_{ij}+1) \tag{1}$$

Here, N is a contained level, T is maximum parallelism of each of contained levels, and L is the number of lock variables.

Figure 7:
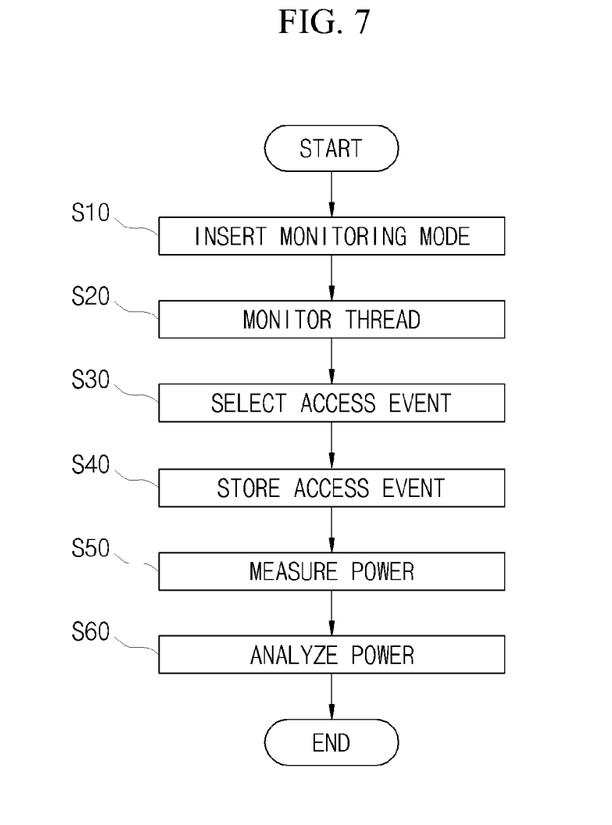
FIG. 7 is a flow chart illustrating a scalable monitoring method for race detection of a multicore-based parallel program according to an embodiment of the present invention.

FIG. 7 is a flow chart illustrating a scalable monitoring method for race detection of a multicore-based parallel program according to an embodiment of the present invention.

Referring to FIG. 7, the scalable monitoring method for race detection of a multicore-based parallel program according to an embodiment of the present invention includes a monitoring code inserting step (S10) of adding a scalable monitoring code to a source parallel program to generate a transformed source parallel program, a thread monitoring step (S20) of generating a data structure of each thread generated according to execution of the transformed source parallel program, an access event selecting step (S30) of inspecting a likelihood of a race according to execution of the transformed source parallel program using the data structure generated for each thread, to select an access event, an access event storage step (S40) of storing the selected access event in a shared data structure, a power measuring step (S50) of measuring and storing power data according to execution of the source parallel program, and a power analyzing step (S60) of analyzing the power data to detect whether an energy bug has been generated.

In the monitoring inserting step (S10), a transformed source parallel program is generated by adding a code for scalable monitoring to a position in which parallelism is generated, a position in which a shared variable is used, and a position of a synchronization command, while scanning a source parallel program (a program available for multiprocessing and multithreading). The scalable monitoring code is a thread generation/extinction code, a code for monitoring a read access event (R) of a shared variable, a code for monitoring a write access event (W) of a shared variable, a synchronization monitoring code, or the like. The scalable monitoring code is operated to monitor a thread, an access event, synchronization, or the like, during execution of a program.

In the thread monitoring step (S20), a data structure of each thread generated according to execution of the transformed source parallel program transformed upon being executed by a code added to a position in which parallelism is generated.

In the access event selecting step (S30), a likelihood of a race of access events with respect to shared variables according to execution of a source parallel program transformed by a code added to a position in which a shared variable is used is inspected and an access event is selected according to the inspection results.

Figure 8:
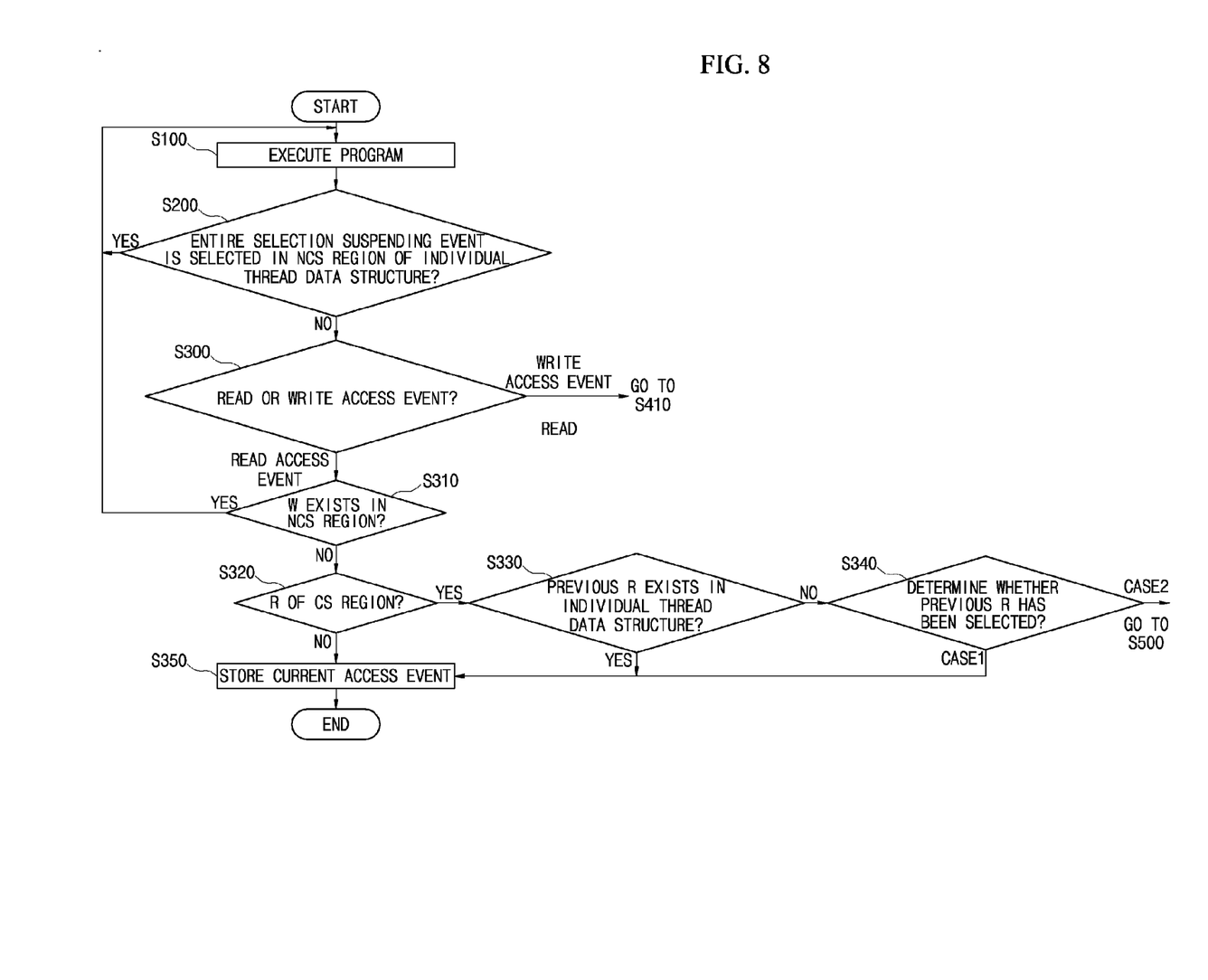
FIGS. 8 through 10 are flow charts illustrating a process of selecting an access event in a scalable monitoring method for race detection of a multicore-based parallel program according to an embodiment of the present invention.
Figure 9:
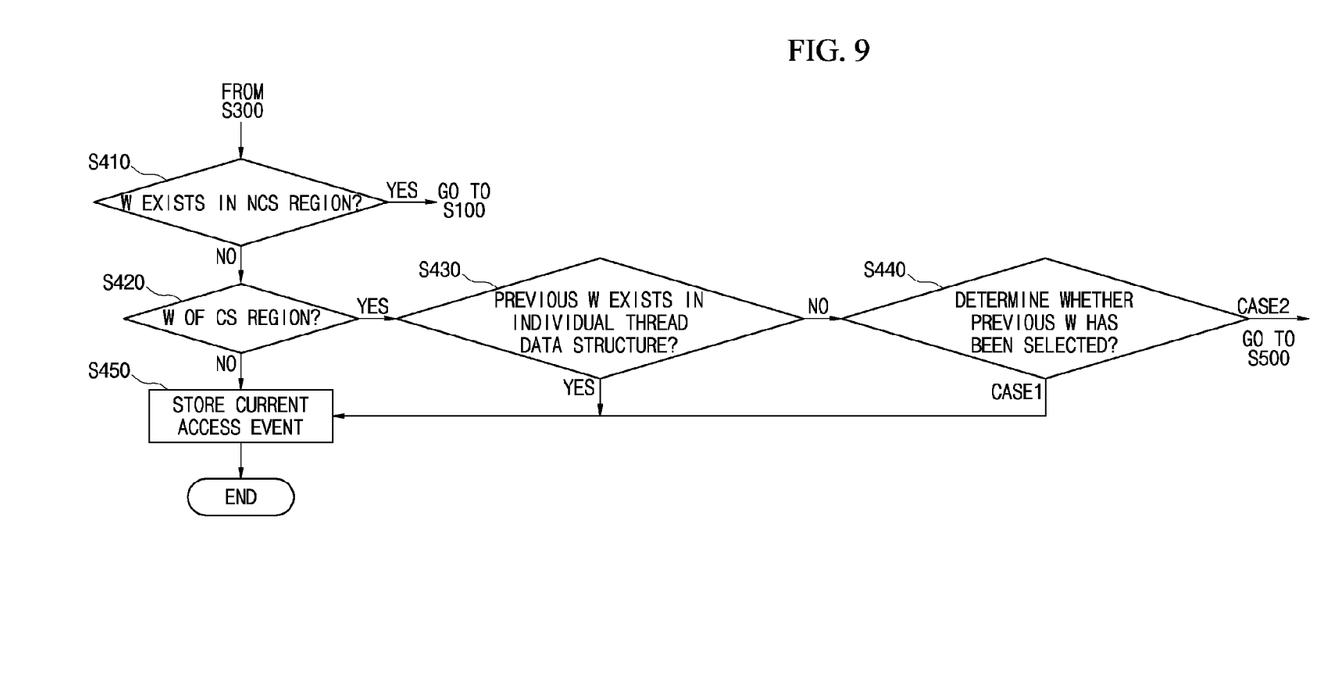
Figure 10:
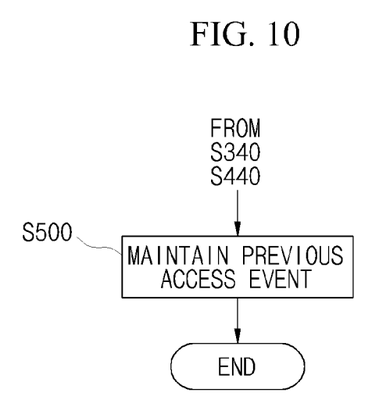

FIGS. 8 through 10 are flow charts illustrating a process of selecting an access event in a scalable monitoring method for race detection of a multicore-based parallel program according to an embodiment of the present invention. Individual thread data structures mentioned in FIGS. 8 and 9 refer to a Boolean type data structures for storing whether a read access event (R) and a write access event (W) has been generated in a cache in order to determine whether to select access events that occur in each thread, NCS is a region outside of a critical section (CS), and CS is a region within a critical section.

First, referring to FIG. 8, a program is executed in step S100.

According to execution of the program, it is determined whether an entire selection suspending event W is selected in a region outside of individual thread data structures in step S200.

Here, when the entire selection suspending case has already been selected, the process is returned to the program execution step S100, and when the entire selection suspending event has not been selected, whether a read access event has occurred is determined in step S300.

When a read access event has occurred, it is determined whether a read/write access event exists in an NCS region (region outside of the CS) of the individual thread data structures in step S310.

When a write access event W is not present in the NCS region according to the determination result, it is determined whether the read access event is a read access event R in the CS region (region within the CS) in steps S320 and S420.

When the read access event is not a read access event in the CS region, the current access event is stored in the individual thread data structures in step S350.

When the read access event is a read access event of the CS region, it is determined whether a previous read access event R exists in the individual thread data structures in step S330.

When a previous read access event exists in the individual thread data structures, the current access event is stored in the individual thread data structures in step S350, and when a previous read access event is not present in the individual thread data structures, it is determined whether a previous read access event R is selected in step S340. When the previous read access event R is selected according to the determination results, the current access event is stored in the individual thread data structures in step S350. When the previous read access event R is not selected, the process is moved to step S500.

When a read access event does not occur in step S300, namely, when a write access event occurs, the process is moved to step S410 of FIG. 9.

Referring to FIG. 9, when a write access event occurs, it is determined whether a write access event W exists in the NCS region (region outside the CS) of the individual thread data structures in step S410.

When the write access event W is not present in the NCS region, it is determined whether the write access event is a write access event W in the CS region (region within the CS) in step S420.

When the write access event is not a write access event in the CS region, the current access event is stored in the individual thread data structures in step S450, and when the write access event is a write access event of the CS region, it is determined whether a previous write access event exists in the individual thread data structures in step S430.

When a previous write access event W exists in the individual thread data structures, the current access event is stored in the individual thread data structures in step S450, and when the previous write access event W is not present in the individual thread data structures, whether to select the previous write access event W is determined in step S440.

When the previous write access event W is selected according to the determination result, the current access event is stored in the individual thread data structures in step S450, and when the previous write access event W is not selected, the previous write access event is maintained in step S500.

A basic algorithm of the steps (S340 and S440) of inspecting whether the previous read/write access event is selected is selecting an access event that is likely to race first, in consideration of an ordered relationship between the previous access event and the current access event and whether the previous access event and the current access event has the same variable or a lock variable.

In the steps (S340 and S440) of inspecting whether the previous read/write access event is selected, when the access event selecting is based on simple mode monitoring, access events that occur in each thread is inspected, and when the access event selecting is based on detail mode monitoring, access events that occur in a certain other thread, as well as an access event that occurs in each thread, are inspected, and an access event is selected using individual data structures and parallelism between threads.

The detail mode selecting may have excellent performance of a scalable monitoring technique in terms of the number of selected access events, relative to the simple mode selecting, but temporal and spatial complexity thereof is increased.

Figure 11:
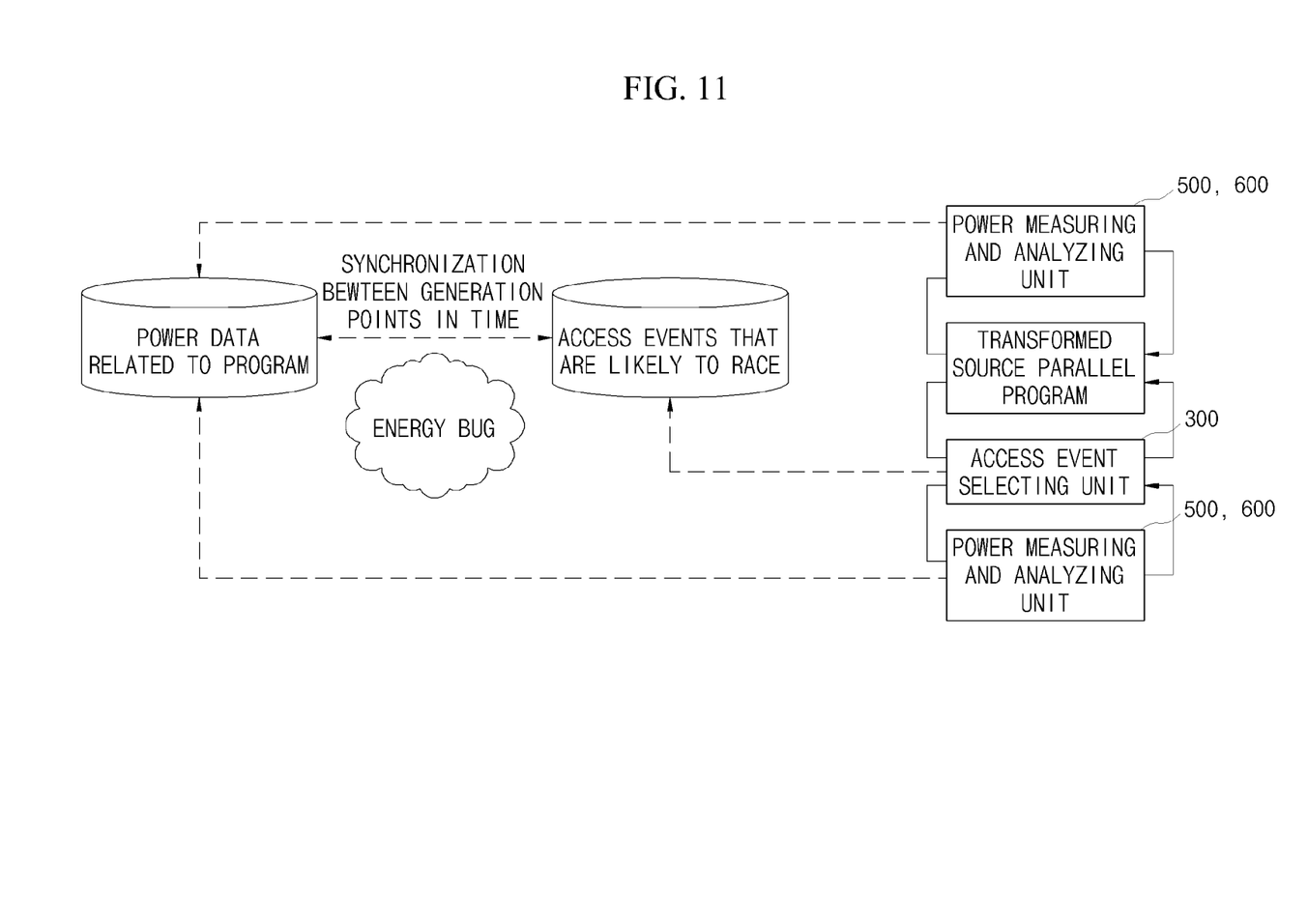
FIG. 11 is a conceptual view illustrating a process of selecting an access event with respect to a shared variable generated in a parallel program and a process of detecting an energy bug through power measurement according to an embodiment of the present invention.

FIG. 11 is a conceptual view illustrating a process of detecting an energy bug through a process of selecting an access event with respect to a shared variable generated in a parallel program and power measurement according to an embodiment of the present invention.

FIG. 11 is a conceptual view illustrating a process of selecting an access event with respect to a shared variable generated in a parallel program. Specifically, FIG. 11 illustrates a process of scalably monitoring access events in a source parallel program transformed by adding a scalable monitoring code to a source parallel program, and simultaneously measuring and analyzing power.

The access event selecting unit 300 and the power measuring and analyzing units 500 and 600 record every power data generated during execution of a program, and in the recorded power data, access events that are likely to race and a generation time are synchronized.

Due to synchronization, when a point in time at which a large amount of power is consumed is discovered, which access event the access event selecting unit 300 is monitoring at a corresponding point in time may be recognized.

A race may occur due to access events and a large amount of power may be unexpectedly consumed in a program due to a race. However, according to the embodiments of the present invention, a race that occurs in a parallel computing environment is effectively monitored, and since an amount of monitored access events is reduced, an energy bug may be effectively detected in a system with which power consumption weighs.

In the scalable monitoring apparatus and method for race detection in multicore-based parallel program according to the embodiments of the present invention, a race that occurs in a parallel computing environment is effectively detected and, since a monitoring amount of access events is reduced, an error may be effectively detected.

In particular, since the number of access events that are applied in an embedded system, with which power consumption weighs, to access history is reduced, an error may be effectively detected.

In addition, energy bugs that may occur in a program may be detected.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scalable monitoring apparatus for race detection of a multicore-based parallel program, the scalable monitoring apparatus comprising:
a monitoring code inserting unit configured to add a scalable monitoring code to a source parallel program to generate a transformed source parallel program;
a thread monitoring unit configured to generate a data structure of a thread generated according to execution of the transformed source parallel program;
an access event selecting unit configured to inspect a race likelihood according to execution of the transformed source parallel program to select an access event;
an access event storage unit configured to store the access event selected by the access event selecting unit in a shared data structure;
a power measuring unit configured to measure power data according to execution of the source parallel program and store the measured power data; and
a power analyzing unit configured to analyze the power data stored by the power measuring unit to determine whether an energy bug has been generated,
wherein the power measuring unit measures the power data in synchronization with a point in time at which the access event selecting unit selects the access event.

2. The scalable monitoring apparatus of claim 1, wherein the monitoring code inserting unit scans the source parallel program available for multiprocessing and multithreading and adds a scalable monitoring code to at least one of a parallelism generation position, a position in which a shared variable is used, and a position of a synchronization command.

3. The scalable monitoring apparatus of claim 2, wherein the monitoring code inserting unit adds at least one of a thread generation code, a thread extinction code, a code for monitoring a read access event of a shared variable, a code for monitoring a write access event of a shared variable, and a synchronization monitoring code to the source parallel program.

4. The scalable monitoring apparatus of claim 2, wherein the thread monitoring unit generates a data structure of a thread generated according to execution of the transformed source parallel program, which has been transformed by a code added to a parallelism generation position by the monitoring code inserting unit upon scanning the source parallel program.

5. The scalable monitoring apparatus of claim 2, wherein the access event selecting unit inspects a likelihood of a race with respect to a shared variable according to execution of the transformed source parallel program executed by a code added to a position in which the shared variable is used, by the monitoring code inserting unit, to select the access event.

6. The scalable monitoring apparatus of claim 5, wherein the access event selecting unit selects the access event using an individual data structure of the thread or selects the access event using the individual data structure of the thread or parallelism between threads.

7. The scalable monitoring apparatus of claim 1, wherein the power analyzing unit determines whether an energy bug has been generated by analyzing power data while maintaining synchronization between inspection of a likelihood of a race by the access event selecting unit and measurement of the power data.

8. A scalable monitoring method for race detection of a multicore-based parallel program, the scalable monitoring method comprising:
adding a scalable monitoring code to a source parallel program to generate a transformed source parallel program;
generating a data structure of each thread generated according to execution of the transformed source parallel program;
inspecting a likelihood of a race according to execution of the transformed source parallel program using the data structure generated for each thread, to select an access event;
storing the selected access event in a shared data structure;
measuring and storing power data according to execution of the source parallel program; and analyzing the power data to detect whether an energy bug has been generated, wherein the measuring of power comprises measuring the power data in synchronization with a point in time at which the access event is selected in the selecting of an access event.

9. The scalable monitoring method of claim 8, wherein the inserting of a monitoring code comprises scanning the source parallel program available and adding a scalable monitoring code to at least one of a position in which parallelism is generated, a position in which a shared variable is used, and a position of a synchronization command.

10. The scalable monitoring method of claim 9, wherein the monitoring of a thread comprises generating a data structure of each thread generated according to execution of the transformed source parallel program transformed using a scalable monitoring code added to the position in which parallelism is generated.

11. The scalable monitoring method of claim 9, wherein the selecting of an access event comprises selecting an access event by inspecting a likelihood of a race with respect to the shared variable according to the transformed source parallel program transformed using a scalable monitoring code added to the position in which the shared variable is used.

12. The scalable monitoring method of claim 11, wherein the selecting of an access event comprises:
  determining whether an entire selection suspending event is selected in a region outside of a critical section of an individual thread data structure;
  when the entire selection suspending event is not selected, determining whether an access event exists in a region outside of the critical section of the individual thread data structure;
  when the access event does not exist, determining whether a current access event is an access event in a region within the critical section;
  when the current access event is an access event in a region within the critical section, storing the current access event in the individual thread data structure; and
  when the current access event is an access event in a region within the critical section, determining whether a previous access event exists in the individual thread data structure, and
  when a previous access event exists in the individual thread data structure, storing the current access event in the individual thread data structure.

13. The scalable monitoring method of claim 12, further comprising, when a previous access event does not exist in the individual thread data structure, inspecting whether a previous access event has been selected.

14. The scalable monitoring method of claim 13, wherein the inspecting of whether a previous access event has been selected comprises independently selecting an access event for each thread using the individual thread data structure or selecting an access event using the individual thread data structure and information about parallelism between threads.

15. The scalable monitoring method of claim 8, wherein the analyzing of power comprises detecting whether an energy bug has been generated by analyzing the power data, while maintaining synchronization between a point in time at which a likelihood of a race is inspected in the selecting of an access event and a point in time at which the power data is measured.

16. A scalable monitoring system for race detection of a multicore-based parallel program, the scalable monitoring system comprising:
  a scalable race detecting module configured to inspect a likelihood of a race of an access event with respect to a shared variable generated in a parallel program to select an access event that is likely to race; and
  a power measuring module configured to measure power consumption when the parallel program is executed, to analyze whether an energy bug has been generated,
  wherein the power measuring module measures power consumption in synchronization with a point in time at which the scalable race detecting module selects an access event.

17. The scalable monitoring system of claim 16, wherein the scalable race detecting module adds a monitoring code to the parallel program to transform the parallel program, generates a data structure of a thread according to execution of the transformed parallel program, inspects a likelihood of a race of an access event with respect to the shared variable, and selects the access event using the individual data structure of the thread or selects the access event using the individual data structure of the thread and parallelism between threads.

18. The scalable monitoring system of claim 17, wherein the power measuring module determines whether an energy bug has been generated by analyzing the power consumption, while maintaining synchronization between the inspection of a likelihood of a race and the measurement of power consumption.

* * * * *